United States Patent
Palmquist

(10) Patent No.: US 8,577,916 B1
(45) Date of Patent: Nov. 5, 2013

(54) SEARCH-BASED CONTACT INITIATION METHOD AND APPARATUS

(75) Inventor: Michael Palmquist, Oakland, CA (US)

(73) Assignee: Avaya Inc., Basking Ridge, NJ (US)

( * ) Notice: Subject to any disclaimer, the term of this patent is extended or adjusted under 35 U.S.C. 154(b) by 1511 days.

(21) Appl. No.: 11/469,698

(22) Filed: Sep. 1, 2006

(51) Int. Cl.
*G06F 17/30* (2006.01)

(52) U.S. Cl.
USPC .......................................... 707/770; 705/7.14

(58) Field of Classification Search
USPC ..................... 705/7, 7.14; 379/265; 707/770
See application file for complete search history.

(56) References Cited

U.S. PATENT DOCUMENTS

| | | |
|---|---|---|
| 5,825,869 A | 10/1998 | Brooks et al. |
| 5,832,451 A | 11/1998 | Flake et al. |
| 5,867,494 A | 2/1999 | Krishnaswamy et al. |
| 5,867,495 A | 2/1999 | Elliott et al. |
| 5,894,512 A | 4/1999 | Zenner |
| 5,905,792 A | 5/1999 | Miloslavsky |
| 5,915,011 A | 6/1999 | Miloslavsky |
| 5,915,012 A | 6/1999 | Miloslavsky |
| 5,930,764 A | 7/1999 | Melchione et al. |
| 5,933,492 A | 8/1999 | Turovski |
| 5,940,496 A | 8/1999 | Gisby et al. |
| 5,940,497 A | 8/1999 | Miloslavsky |
| 5,946,387 A | 8/1999 | Miloslavsky |
| 5,953,332 A | 9/1999 | Miloslavsky |
| 5,966,695 A | 10/1999 | Melchione et al. |
| 5,970,065 A | 10/1999 | Miloslavsky |
| 5,991,391 A | 11/1999 | Miloslavsky |
| 5,991,392 A | 11/1999 | Miloslavsky |
| 5,999,525 A | 12/1999 | Krishnaswamy et al. |
| 6,011,792 A | 1/2000 | Miloslavsky |
| 6,021,428 A | 2/2000 | Miloslavsky |
| 6,055,308 A | 4/2000 | Miloslavsky et al. |
| 6,055,513 A | 4/2000 | Katz et al. |
| 6,058,435 A | 5/2000 | Sassin et al. |
| 6,064,667 A | 5/2000 | Gisby et al. |
| 6,104,801 A | 8/2000 | Miloslavsky |
| 6,167,395 A | 12/2000 | Beck et al. |
| 6,175,563 B1 | 1/2001 | Miloslavsky |
| 6,175,564 B1 | 1/2001 | Miloslavsky et al. |
| 6,181,788 B1 | 1/2001 | Miloslavsky |

(Continued)

FOREIGN PATENT DOCUMENTS

| | | |
|---|---|---|
| EP | 0740450 | 10/1996 |
| EP | 0821510 | 1/1998 |

(Continued)

OTHER PUBLICATIONS

Prior Art Search completed May 3, 2006, 316 pages.
"Match.com Mobile Frequently Asked Questions", Match.com, LP, 2003, [retrieved on Jul. 11, 2008], 5 pages. Retrieved from http://web.archive.org/web/20060407192306/http://mobile.match.com/help.html.

(Continued)

*Primary Examiner* — Huawen Peng
(74) *Attorney, Agent, or Firm* — Sheridan Ross P.C.

(57) ABSTRACT

Search-based contact initiation methods and apparatus are provided. In particular, a contact initiator enters search terms in the form of qualifications or characteristics desired of a contact recipient. The search term are used to search qualifications records that include qualifications entered or selected by candidate qualifications recipients. When a match or best match between search criteria and a record associated with a candidate communication recipient is found, the contact initiator is placed into communication with that communication recipient. Communications between the communications initiator and the communication recipient are established using a contact address associated with the qualifications of the communication recipient.

14 Claims, 5 Drawing Sheets

(56) References Cited

U.S. PATENT DOCUMENTS

| | | |
|---|---|---|
| 6,185,287 B1 | 2/2001 | Miloslavsky |
| 6,229,888 B1 | 5/2001 | Miloslavsky |
| 6,236,977 B1 | 5/2001 | Verba et al. |
| 6,289,094 B1 | 9/2001 | Miloslavsky |
| 6,335,927 B1 | 1/2002 | Elliott et al. |
| 6,356,633 B1 | 3/2002 | Armstrong |
| 6,373,836 B1 | 4/2002 | Deryugin et al. |
| 6,389,400 B1 * | 5/2002 | Bushey et al. .................... 705/7 |
| 6,408,066 B1 | 6/2002 | Andruska et al. |
| 6,449,270 B1 | 9/2002 | Miloslavsky |
| 6,477,533 B2 | 11/2002 | Schiff et al. |
| 6,493,446 B1 | 12/2002 | Cherry |
| 6,554,705 B1 | 4/2003 | Cumbers |
| 6,597,685 B2 | 7/2003 | Miloslavsky et al. |
| 6,606,744 B1 | 8/2003 | Mikurak |
| 6,625,139 B2 | 9/2003 | Miloslavsky et al. |
| 6,639,982 B1 | 10/2003 | Stuart et al. |
| 6,665,395 B1 | 12/2003 | Busey et al. |
| 6,671,818 B1 | 12/2003 | Mikurak |
| 6,683,941 B2 | 1/2004 | Brown et al. |
| 6,708,176 B2 | 3/2004 | Strunk et al. |
| 6,708,205 B2 | 3/2004 | Sheldon et al. |
| 6,731,625 B1 | 5/2004 | Eastep et al. |
| 6,731,927 B1 | 5/2004 | Stern et al. |
| 6,744,877 B1 | 6/2004 | Edwards |
| 6,754,181 B1 | 6/2004 | Elliott et al. |
| 6,783,459 B2 | 8/2004 | Cumbers |
| 6,785,710 B2 | 8/2004 | Kikinis |
| 6,822,945 B2 | 11/2004 | Petrovykh |
| 6,850,895 B2 | 2/2005 | Brodersen et al. |
| 6,853,721 B2 | 2/2005 | Mengshoel et al. |
| 6,856,680 B2 | 2/2005 | Mengshoel et al. |
| 6,879,586 B2 | 4/2005 | Miloslavsky et al. |
| 6,889,222 B1 | 5/2005 | Zhao |
| 6,895,084 B1 | 5/2005 | Saylor et al. |
| 6,909,708 B1 | 6/2005 | Krishnaswamy et al. |
| 6,922,689 B2 | 7/2005 | Shtivelman |
| 6,934,381 B1 | 8/2005 | Klein et al. |
| 6,941,305 B2 | 9/2005 | Magouirk et al. |
| 6,954,731 B1 | 10/2005 | Montague |
| 6,978,006 B1 | 12/2005 | Polcyn |
| 6,981,020 B2 | 12/2005 | Miloslavsky et al. |
| 7,023,979 B1 * | 4/2006 | Wu et al. .................. 379/265.11 |
| 7,027,586 B2 * | 4/2006 | Bushey et al. ........... 379/265.09 |
| 7,035,905 B2 | 4/2006 | Kikinis |
| 7,039,594 B1 | 5/2006 | Gersting |
| 2001/0001854 A1 | 5/2001 | Schena et al. |
| 2001/0003176 A1 | 6/2001 | Schena et al. |
| 2001/0003177 A1 | 6/2001 | Schena et al. |
| 2001/0005829 A1 | 6/2001 | Raveis, Jr. |
| 2001/0038623 A1 | 11/2001 | Miloslavsky |
| 2001/0040887 A1 | 11/2001 | Shtivelman et al. |
| 2001/0043586 A1 | 11/2001 | Miloslavsky |
| 2002/0013519 A1 | 1/2002 | Adams et al. |
| 2002/0019784 A1 | 2/2002 | Ritz |
| 2002/0019846 A1 | 2/2002 | Miloslavsky et al. |
| 2002/0046040 A1 | 4/2002 | Kirner |
| 2002/0049624 A1 | 4/2002 | Raveis, Jr. |
| 2002/0055906 A1 | 5/2002 | Katz et al. |
| 2002/0055975 A1 | 5/2002 | Petrovykh |
| 2002/0056000 A1 | 5/2002 | Coussement |
| 2002/0059095 A1 | 5/2002 | Cook |
| 2002/0059138 A1 | 5/2002 | Priest et al. |
| 2002/0064149 A1 | 5/2002 | Elliott et al. |
| 2002/0065885 A1 | 5/2002 | Buonanno et al. |
| 2002/0143609 A1 | 10/2002 | Magouirk et al. |
| 2002/0147625 A1 | 10/2002 | Kolke, Jr. |
| 2002/0161602 A1 | 10/2002 | Dougherty et al. |
| 2002/0165745 A1 | 11/2002 | Greene et al. |
| 2002/0169644 A1 | 11/2002 | Greene |
| 2002/0169650 A1 | 11/2002 | Dougherty et al. |
| 2002/0184500 A1 | 12/2002 | Maritzen et al. |
| 2003/0007627 A1 | 1/2003 | Elsey et al. |
| 2003/0009530 A1 | 1/2003 | Philonenko et al. |
| 2003/0013438 A1 | 1/2003 | Darby |
| 2003/0032409 A1 | 2/2003 | Hutcheson et al. |
| 2003/0119492 A1 | 6/2003 | Timmins et al. |
| 2003/0126136 A1 | 7/2003 | Omoigui |
| 2003/0130904 A1 | 7/2003 | Katz et al. |
| 2003/0158960 A1 | 8/2003 | Engberg |
| 2003/0165223 A1 | 9/2003 | Timmins et al. |
| 2003/0179876 A1 | 9/2003 | Fox et al. |
| 2003/0179877 A1 | 9/2003 | Dezonno et al. |
| 2003/0187784 A1 | 10/2003 | Maritzen et al. |
| 2003/0231647 A1 | 12/2003 | Petrovykh |
| 2004/0015380 A1 | 1/2004 | Timmins |
| 2004/0015408 A1 | 1/2004 | Rauen, IV et al. |
| 2004/0029567 A1 | 2/2004 | Timmins et al. |
| 2004/0047302 A1 | 3/2004 | Dezonno et al. |
| 2004/0054610 A1 | 3/2004 | Amstutz et al. |
| 2004/0054743 A1 | 3/2004 | McPartlan et al. |
| 2004/0057569 A1 | 3/2004 | Busey et al. |
| 2004/0058710 A1 | 3/2004 | Timmins et al. |
| 2004/0064351 A1 | 4/2004 | Mikurak |
| 2004/0081310 A1 | 4/2004 | Lueckhoff |
| 2004/0081311 A1 | 4/2004 | Thompson |
| 2004/0082345 A1 | 4/2004 | Lueckhoff |
| 2004/0093268 A1 | 5/2004 | Ramchandani et al. |
| 2004/0093281 A1 | 5/2004 | Silverstein et al. |
| 2004/0103160 A1 | 5/2004 | Sheldon et al. |
| 2004/0125939 A1 | 7/2004 | Drobek |
| 2004/0132433 A1 | 7/2004 | Stern et al. |
| 2004/0141508 A1 | 7/2004 | Schoeneberger et al. |
| 2004/0143473 A1 | 7/2004 | Tivey et al. |
| 2004/0143476 A1 | 7/2004 | Kapadia et al. |
| 2004/0143482 A1 | 7/2004 | Tivey et al. |
| 2004/0143483 A1 | 7/2004 | Tivey et al. |
| 2004/0143484 A1 | 7/2004 | Kapadia et al. |
| 2004/0143496 A1 | 7/2004 | Saenz |
| 2004/0146047 A1 | 7/2004 | Turcan et al. |
| 2004/0161097 A1 | 8/2004 | Henry |
| 2004/0202308 A1 | 10/2004 | Baggenstoss et al. |
| 2004/0202309 A1 | 10/2004 | Baggenstoss et al. |
| 2004/0203629 A1 | 10/2004 | Dezonno et al. |
| 2004/0208309 A1 | 10/2004 | Miloslavsky |
| 2004/0211834 A1 | 10/2004 | Fleckenstein et al. |
| 2004/0213400 A1 | 10/2004 | Golitsin et al. |
| 2004/0249658 A1 | 12/2004 | Schwerin-Wenzel et al. |
| 2004/0267595 A1 | 12/2004 | Woodings et al. |
| 2004/0267892 A1 | 12/2004 | Kikinis |
| 2005/0008139 A1 | 1/2005 | Beckstrom et al. |
| 2005/0015333 A1 | 1/2005 | Schwerin-Wenzel et al. |
| 2005/0015451 A1 | 1/2005 | Sheldon et al. |
| 2005/0021599 A1 | 1/2005 | Peters |
| 2005/0021666 A1 | 1/2005 | Dinnage et al. |
| 2005/0026594 A1 | 2/2005 | Miller et al. |
| 2005/0038688 A1 | 2/2005 | Collins et al. |
| 2005/0041580 A1 | 2/2005 | Petrovykh |
| 2005/0069094 A1 | 3/2005 | James et al. |
| 2005/0076078 A1 | 4/2005 | Salton |
| 2005/0091098 A1 | 4/2005 | Brodersen et al. |
| 2005/0128961 A1 | 6/2005 | Miloslavsky et al. |
| 2005/0135596 A1 | 6/2005 | Zhao |
| 2005/0177380 A1 | 8/2005 | Pritchard et al. |
| 2005/0190053 A1 | 9/2005 | Dione |
| 2005/0190898 A1 | 9/2005 | Priest et al. |
| 2005/0193055 A1 | 9/2005 | Angel et al. |
| 2005/0203782 A1 | 9/2005 | Smith |
| 2005/0209914 A1 | 9/2005 | Nguyen et al. |
| 2005/0216421 A1 | 9/2005 | Barry et al. |
| 2005/0216551 A1 | 9/2005 | Sirstins et al. |
| 2005/0233733 A1 | 10/2005 | Roundtree et al. |
| 2005/0251331 A1 | 11/2005 | Kreft |
| 2005/0272413 A1 | 12/2005 | Bourne |
| 2005/0283475 A1 | 12/2005 | Beranek et al. |
| 2006/0002540 A1 | 1/2006 | Kreiner et al. |
| 2006/0036590 A1 | 2/2006 | Kouchri et al. |
| 2006/0059107 A1 | 3/2006 | Elmore et al. |
| 2006/0064340 A1 | 3/2006 | Cook |
| 2006/0072739 A1 | 4/2006 | Baggenstoss et al. |

(56) References Cited

U.S. PATENT DOCUMENTS

FOREIGN PATENT DOCUMENTS

| | | |
|---|---|---|
| EP | 0866407 | 9/1998 |
| EP | 0982915 | 3/2000 |
| EP | 1035718 | 9/2000 |
| EP | 1039732 | 9/2000 |
| EP | 1056264 | 11/2000 |
| EP | 1075130 | 2/2001 |
| EP | 0930764 | 3/2001 |
| EP | 1107559 | 6/2001 |
| EP | 1119169 | 7/2001 |
| EP | 1139257 | 10/2001 |
| EP | 1162814 | 12/2001 |
| EP | 1168217 | 1/2002 |
| EP | 1172995 | 1/2002 |
| EP | 1199872 | 4/2002 |
| EP | 1206106 | 5/2002 |
| EP | 1225752 | 7/2002 |
| EP | 1227635 | 7/2002 |
| EP | 1296502 | 3/2003 |
| EP | 1143364 | 5/2003 |
| EP | 1326415 | 7/2003 |
| EP | 1328121 | 7/2003 |
| EP | 1333653 | 8/2003 |
| EP | 0873642 | 4/2004 |
| EP | 0949793 | 5/2004 |
| EP | 0949794 | 5/2004 |
| EP | 1107615 | 6/2004 |
| EP | 0856980 | 7/2004 |
| EP | 0908047 | 9/2004 |
| EP | 1457909 | 9/2004 |
| EP | 1478167 | 11/2004 |
| EP | 1484903 | 12/2004 |
| EP | 1564977 | 8/2005 |
| EP | 0995300 | 9/2005 |
| EP | 0985308 | 11/2005 |
| EP | 1359735 | 1/2006 |
| EP | 1357729 | 2/2006 |
| EP | 1377001 | 2/2006 |
| EP | 0954922 | 3/2006 |
| WO | WO 97/15023 | 4/1997 |
| WO | WO 97/27556 | 7/1997 |
| WO | WO 97/28635 | 8/1997 |
| WO | WO 98/01987 | 1/1998 |
| WO | WO 98/23080 | 5/1998 |
| WO | WO 98/31130 | 7/1998 |
| WO | WO 98/34390 | 8/1998 |
| WO | WO 98/34391 | 8/1998 |
| WO | WO 98/37687 | 8/1998 |
| WO | WO 98/47298 | 10/1998 |
| WO | WO 98/53593 | 11/1998 |
| WO | WO 98/54877 | 12/1998 |
| WO | WO 99/03248 | 1/1999 |
| WO | WO 99/13635 | 3/1999 |
| WO | WO 99/14951 | 3/1999 |
| WO | WO 99/15979 | 4/1999 |
| WO | WO 99/27698 | 6/1999 |
| WO | WO 99/33016 | 7/1999 |
| WO | WO 99/45716 | 9/1999 |
| WO | WO 99/46706 | 9/1999 |
| WO | WO 99/57900 | 11/1999 |
| WO | WO 99/60766 | 11/1999 |
| WO | WO 99/67718 | 12/1999 |
| WO | WO 00/22860 | 4/2000 |
| WO | WO 00/26816 | 5/2000 |
| WO | WO 00/33238 | 6/2000 |
| WO | WO 00/41119 | 7/2000 |
| WO | WO 00/41382 | 7/2000 |
| WO | WO 00/70525 | 11/2000 |
| WO | WO 00/70849 | 11/2000 |
| WO | WO 00/72219 | 11/2000 |
| WO | WO 00/72220 | 11/2000 |
| WO | WO 00/72535 | 11/2000 |
| WO | WO 01/02927 | 1/2001 |
| WO | WO 01/13248 | 2/2001 |
| WO | WO 01/13299 | 2/2001 |
| WO | WO 01/13606 | 2/2001 |
| WO | WO 01/27838 | 4/2001 |
| WO | WO 01/27839 | 4/2001 |
| WO | WO 01/33402 | 5/2001 |
| WO | WO 01/33467 | 5/2001 |
| WO | WO 01/39028 | 5/2001 |
| WO | WO 01/39029 | 5/2001 |
| WO | WO 01/39030 | 5/2001 |
| WO | WO 01/39082 | 5/2001 |
| WO | WO 01/39086 | 5/2001 |
| WO | WO 01/40963 | 6/2001 |
| WO | WO 01/40978 | 6/2001 |
| WO | WO 01/41372 | 6/2001 |
| WO | WO 01/44888 | 6/2001 |
| WO | WO 01/52089 | 7/2001 |
| WO | WO 01/52095 | 7/2001 |
| WO | WO 01/54388 | 7/2001 |
| WO | WO 01/61594 | 8/2001 |
| WO | WO 01/65455 | 9/2001 |
| WO | WO 01/67334 | 9/2001 |
| WO | WO 01/75549 | 10/2001 |
| WO | WO 01/75680 | 10/2001 |
| WO | WO 01/90968 | 11/2001 |
| WO | WO 01/90994 | 11/2001 |
| WO | WO 02/07050 | 1/2002 |
| WO | WO 02/07460 | 1/2002 |
| WO | WO 02/09006 | 1/2002 |
| WO | WO 02/09399 | 1/2002 |
| WO | WO 02/09406 | 1/2002 |
| WO | WO 02/10964 | 2/2002 |
| WO | WO 02/37926 | 5/2002 |
| WO | WO 02/39220 | 5/2002 |
| WO | WO 02/46868 | 6/2002 |
| WO | WO 02/054333 | 7/2002 |
| WO | WO 02/065320 | 8/2002 |
| WO | WO 02/076077 | 9/2002 |
| WO | WO 02/089455 | 11/2002 |
| WO | WO 02/097705 | 12/2002 |
| WO | WO 02/098054 | 12/2002 |
| WO | WO 02/101712 | 12/2002 |
| WO | WO 02/103600 | 12/2002 |
| WO | WO 03/009098 | 1/2003 |
| WO | WO 03/014884 | 2/2003 |
| WO | WO 03/017041 | 2/2003 |
| WO | WO 03/025776 | 3/2003 |
| WO | WO 03/036415 | 5/2003 |
| WO | WO 03/063458 | 7/2003 |
| WO | WO 03/079189 | 9/2003 |
| WO | WO 03/079656 | 9/2003 |
| WO | WO 03/096159 | 11/2003 |
| WO | WO 2004/010355 | 1/2004 |
| WO | WO 2004/017550 | 2/2004 |
| WO | WO 2004/017584 | 2/2004 |
| WO | WO 2004/021127 | 3/2004 |
| WO | WO 2004/023324 | 3/2004 |
| WO | WO 2004/027546 | 4/2004 |
| WO | WO 2004/038529 | 5/2004 |
| WO | WO 2004/039035 | 5/2004 |
| WO | WO 2004/042523 | 5/2004 |
| WO | WO 2004/042536 | 5/2004 |
| WO | WO 2004/042663 | 5/2004 |
| WO | WO 2004/044688 | 5/2004 |
| WO | WO 2004/063854 | 7/2004 |
| WO | WO 2004/075024 | 9/2004 |
| WO | WO 2004/075466 | 9/2004 |
| WO | WO 2004/107094 | 12/2004 |
| WO | WO 2005/006138 | 1/2005 |
| WO | WO 2005/006226 | 1/2005 |
| WO | WO 2005/011240 | 2/2005 |
| WO | WO 2005/011243 | 2/2005 |
| WO | WO 2005/013099 | 2/2005 |
| WO | WO 2005/020546 | 3/2005 |
| WO | WO 2005/020547 | 3/2005 |
| WO | WO 2005/045607 | 5/2005 |
| WO | WO 2005/081852 | 9/2005 |
| WO | WO 2005/091190 | 9/2005 |
| WO | WO 2005/094350 | 10/2005 |
| WO | WO 2005/103624 | 11/2005 |

(56) References Cited

FOREIGN PATENT DOCUMENTS

| WO | WO 2005/104724 | 11/2005 |
|----|----------------|---------|
| WO | WO 2005/119545 | 12/2005 |
| WO | WO 2006/017622 | 2/2006 |
| WO | WO 2006/037836 | 4/2006 |
| WO | WO 2006/039670 | 4/2006 |

OTHER PUBLICATIONS

"Match.com Mobile Romance just went mobile" Match.com LP, 2003, [retrieved on Jul.11, 2008], 1 page. Retrieved from: http://web.archive.org/web/20060407192004/http://mobile.match.com/.

\* cited by examiner

SEARCH-BASED CONTACT INITIATION METHOD AND APPARATUS

FIELD

The present invention is related to initiating contacts based on search criteria entered by a party seeking to initiate a contact.

BACKGROUND

Contact centers are commonly used by organizations to provide customer support information or information to potential customers or consumers. In a typical arrangement, a customer will initiate a contact or communication by dialing a telephone number associated with the organization from which the customer desires information. The call may then be routed to particular support groups within the organization based on information entered by the user. For example, the user may respond to prompts to make selections that assist the organization in routing the call to a group that is capable of effectively responding to the customer's inquiry. Routing may also be accomplished by providing particular telephone numbers or other contact addresses based on the nature of the customer's inquiry.

Once a customer contact has been routed to an organization or to a group within an organization, that contact is directed to an agent or other resource that is determined to be capable of handling the inquiry. For example, agents may be grouped according to their skills and/or areas of expertise, and assigned to handle inquiries that are determined to be within the capabilities of those agents. In a typical contact center, customer inquiries are placed in queues if an agent deemed capable of responding to the inquiry is not currently available. Agents are then assigned to queued inquiries as agents become available.

If a customer or other contact initiator has a particular problem or is in need of a particular piece of information, it can be more efficient for the contact initiator to establish communications with a party having the specialized knowledge required to handle the inquiry directly, rather than attempting to reach such a person through normal routing procedures. However, such direct routing requires that the contact initiator have a phone number, e-mail address or other contact address associated with the correct agent or resource. However, contact centers typically do not provide an efficient means for providing or discovering such information. This is because the formal menu structures that are typically used for routing contacts are by nature inflexible and are not well-suited to routing inquiries concerning atypical or non-supported requests. Indeed, in a typical scenario, contact information identifying an expert with respect to a particular field of inquiry is usually obtained through informal processes, such as recognition of a need for routing a call to a particular agent by another agent that has been placed in communication with the contact initiator through normal routing procedures. Accordingly, reaching an appropriate resource can be a time-consuming and frustrating process for a contact initiator.

SUMMARY

The present invention is directed to solving these and other problems and disadvantages of the prior art. According to embodiments of the present invention, a communication or contact initiator enters search criteria comprising particular attributes or qualifications that the contact initiator desires in a resource. The search criteria entered by the communication initiator is then used to identify or select a communication or contact recipient from qualifications data entered by candidate communication recipients. Upon identifying a candidate communication recipient with whom the communication recipient should be placed in communication, communications between the communication initiator and the selected communication recipient are automatically initiated. The automatic initiation of communications includes using a contact address associated with the selected communication recipient's qualification information to establish communication.

In accordance with embodiments of the present invention, qualifications data is stored as qualification records. In general, a qualification record may be established for each candidate communication recipient associated with a contact center or other grouping of resources. Each of the qualification records includes qualifications data entered by the candidate communication recipient, and at least one contact address for that candidate communication recipient. In accordance with further embodiments of the present invention, a qualification record may also include qualifications information entered by an administrator.

Using the search criteria entered by a communication initiator to identify a communications recipient may initially result in the identification of a number of candidate communication recipients who are potentially capable of handling the communication initiator's inquiry. Accordingly, in order to identify a single communication recipient, a rules engine may be employed to identify a single communication recipient from the list of potential communication recipients. This may include identifying those candidate communication recipients that are available, that have qualifications best matching the qualifications entered by the communication initiator, that have the most idle time, a particular rating by other participants, the cost of using the communication recipient, the most idle communication recipient, the least occupied communication recipient, or any other desired criteria. In accordance with embodiments of the present invention, upon identifying a single communication recipient from one or more candidate communication recipients, communications between the communication initiator and the communication recipient are established. Moreover, communications between the communication initiator and the communication recipient may be established without requiring the communication initiator to actually enter a contact address for the communication recipient.

In accordance with embodiments of the present invention, a communication initiator is associated with an initiator communication device that includes a user interface through which the communication initiator may enter search criteria in the form of desired qualifications of a communication recipient. The communication device may also support communications with a communication recipient. A candidate communication recipient is generally associated with a communication device having a contact address that can be used by a communication initiator to establish communications with the communication recipient. In addition, a candidate communication recipient will have entered qualifications data using a device having a suitable user interface in a qualifications database. The device used to enter qualifications information may be the same as or different from the communication device associated with the contact address for the candidate communication recipient.

These and other advantages and features of the present invention will become more readily apparent from the fol-

DETAILED DESCRIPTION

Figure 1:
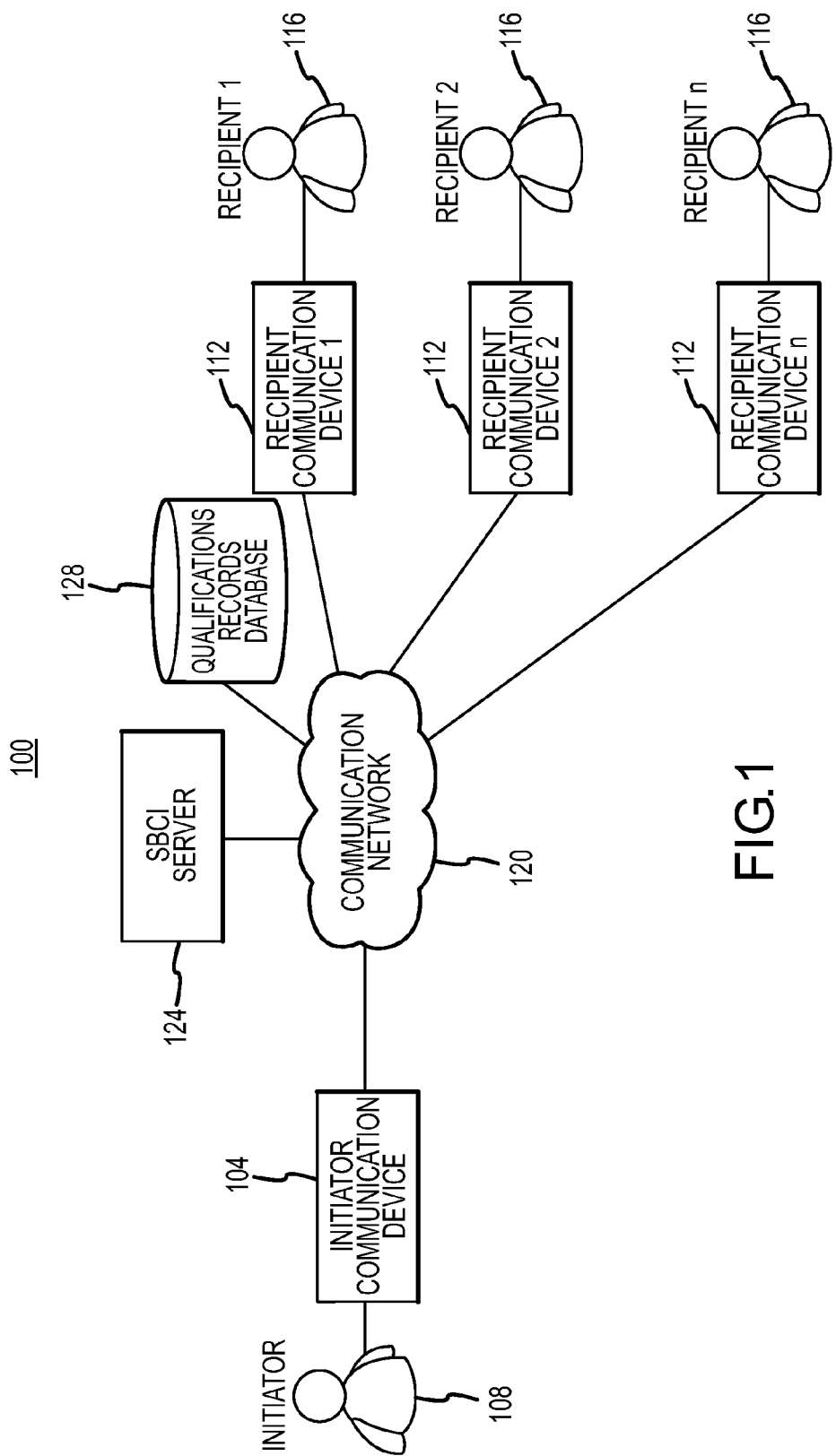
FIG. 1 is a block diagram of a communication arrangement that supports search-based contact initiation in accordance with embodiments of the present invention.

FIG. 1 is a block diagram of an illustrative system 100 featuring search-based communication or contact initiation in accordance with embodiments of the present invention. The system 100 generally includes an initiator communication device 104 associated with a communication or contact initiator 108. The system 100 also generally includes a number of recipient communication devices 112 that each may be associated with a communication or contact recipient 116. The initiator communication device 104 may be capable of communicating with one or more of the recipient communication devices 112 via a communication network 120. The system 100 also may include a search-based communication initiation server 124 and a qualifications records database 128.

An initiator communication device 104 generally functions to receive qualifications information related to the qualifications that a communication initiator 108 desires a communication recipient 116 to possess. In addition, the initiator communication device 104 may be capable of supporting communications between an initiator 108 and an identified communication recipient 116. Alternatively, an initiator communication device 104 may include a first device capable of receiving search criteria from the initiator 108 that is co-located and in communication with a second initiator communication device 104 capable of supporting communications between the initiator 108 and an identified communication recipient 116. Accordingly, examples of initiator communication devices 104 include general purpose computers having TCP/IP communications capabilities, for example through a web-based interface for receiving search criteria, e-mail communications, instant messaging, voice over IP (VoIP), telephony or other communications. Other examples of an initiator communication device 104 include a personal digital assistant (PDA) or a cellular telephone capable of providing a user interface for receiving search criteria and supporting voice or text communications.

A recipient communication device 112 may include any device capable of supporting communications between a communication initiator 108 using an initiator communication device 104 and an associated communication recipient 116. Accordingly, examples of recipient communication devices 112 include general purpose computers supporting voice or video telephony communications, such as a VoIP telephony interface, e-mail communications, or instant messaging. The recipient communication device 112 may also be capable of receiving qualifications information from an associated recipient 116, although another device may be used by a communication recipient 116 to enter such information. Accordingly, a recipient communication device 112 may also include a plain old telephone system (POTS) or private branch exchange (PBX) telephone, for example deployed as part of a contact center.

Communication initiators 108 generally comprise humans having an inquiry associated with particular attributes. These attributes can then be used as search criteria entered by the communication initiator 108 in order to identify a communication recipient 116 appropriate to answer their inquiry or otherwise exchange information with the communication initiator 108.

Candidate communication recipients 116 may comprise contact center agents, company representatives, or others that are capable of answering inquiries or otherwise exchanging information with communication initiators 108. In general, each communication initiator 116 may enter or select qualifications data related to the particular qualifications of a subject communication recipient 116.

The communication network 120 generally functions to support communications between various devices included in the system 100. For example, the communication network 120 may support the communication of search criteria entered at an initiator communication device 104 to the search-based contact initiation server 124 and between the search-based contact initiation server 124 and the qualifications records database 128. In addition, the communication network 120 may support communications between the initiator communication device 104 and an identified recipient communication device 112. As still another example, the communication network 120 may support communications between different recipient communication devices 112, and between a recipient communication device 112 and the search-based contact initiation server 124 and/or the qualifications records database 128. It should be appreciated that the communication network 120 may comprise a number of different network types interconnected to one another and/or operating separately. Examples of communication network 120 types include packet data networks, such as the Internet or an enterprise intranet, the public switched telephony network (PSTN), a text messaging or short message system network, etc.

The search-based contact initiation (SBCI) server 124 may perform searching on behalf of an initiator communication device 104 using search terms or qualifications entered through the initiator communication device 104. More particularly, the search-based contact initiation server 124 may search records included in the qualifications records database 128 for candidate communication recipients 116 using search criteria provided by an initiator 108 through an initiator communication device 104. In connection with such services, the SBCI server 124 may also identify a single communication recipient 116 from a plurality of candidate communication recipients 116 and initiate communications between the initiator communication device 104 and the recipient communication device 112 for the identified or selected communication recipient 116 using a contact address associated with a set of qualifications for the identified communication recipient 116. Alternatively, the SBCI server 124 may search qualifications records using search criteria provided by the communication initiator 108 to identify a communication recipient 116 and may provide the contact address for the recipient communication device 112 associated with the identified communication recipient 116 to the initiator communication device 104 so that the initiator communication device 104 can initiate communications.

In accordance with embodiments of the present invention, the qualifications records database 128 may comprise a store of records related to the qualifications of communication recipients 116. The qualifications records database 128 records include qualifications information entered or selected by the associated communication recipient 116, and a contact address for the associated communication recipient 116. As illustrated, the qualifications records database 128 may be implemented as a separate device interconnected to other devices included in the system 100 via the communication network 120. Alternatively, the qualifications records database 128 may be established, in whole or in part, as part of one or more other devices in the system 100. In accordance with still other embodiments of the present invention, the qualifications records database 128 may comprise records in the form of web pages. Moreover, such web pages may be stored anywhere, for example in any Internet connected device. Accordingly, records comprising the qualifications records database 128 may be stored in a plurality of devices. The qualifications records database 128 may also include records that index other documents containing qualifications or documents (such as presence documents) containing one or more contact addresses.

Figure 2:
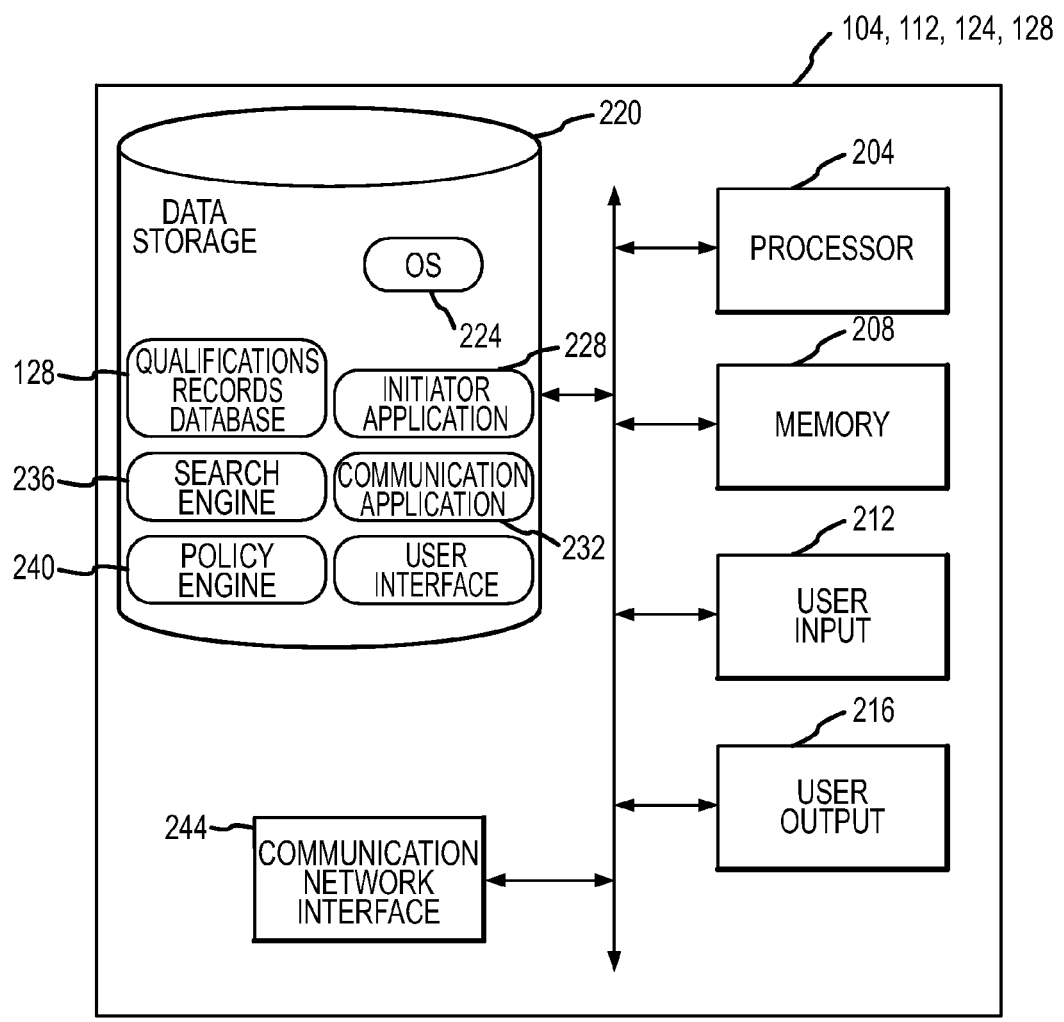
FIG. 2 is a block diagram of components that may be included as part of a communication device or server in accordance with embodiments of the present invention.

FIG. 2 depicts components or features that may be included as part of an initiator communication device 104, a recipient communication device 112, an SBCI server 124, and/or a qualifications records database 128. Because such components may be included as part of (or not included as part of) such devices 104, 112, 124, 128 in various combinations, it should be understood that various of the components are not necessarily limited to any particular device. However, where a typical embodiment includes particular components as part of a particular device of the system 100, mention of such typical arrangement will be made.

The components may include a processor 204 capable of executing program instructions. Accordingly, the processor 204 may include any general purpose programmable processor or controller for executing application programming. Alternatively, the processor may comprise a specially configured application specific integrated circuit (ASIC). The processor 204 generally functions to run programming code implementing various functions performed by the related device. For example, such functions may include the receipt of search criteria, the receipt of qualifications information, the initiation of searches, the selection of a single qualification recipient 116 from a number of candidate qualification recipients 116, the establishment and maintenance of qualifications records and/or a qualifications records database, the initiation of communications between communication devices 104, 112 and/or the support of communications between devices over the communication network 120.

The device 104, 112, 124, 128 may additionally include memory 208 for use in connection with the execution of programming by the processor 204, and for the temporary or long-term storage of data or program instructions. For example, the memory may be used in connection with the operation of applications. The memory 208 may comprise solid-state memory resident, removable or remote in nature, such as DRAM and SDRAM. Where the processor 204 comprises a controller, the memory 208 may be integral to the processor 204.

In addition, various user input devices 212 and user output devices 216 may be provided. Examples of user input devices 212 include a microphone, keyboard, numeric keypad and pointing device combined with a screen or other position encoder. Examples of user output devices 216 include a speaker, alphanumeric display, ringer, or display. In general, user input 212 and user output devices 216 are used by communication initiators 108, communication recipients 116 and/or an administrator to interface with or through other devices or participants in the system 100. Although the user inputs 212 and outputs 216 are shown as being directly connected to the related device, it should be appreciated that features or applications can be accessed remotely.

Data storage 220 may be provided for the storage of application programming and/or data. For example, operating system software 224 may be stored in the data storage 220. An example of a particular application that may be stored in data storage 220 is an initiator application 228. In connection with an initiator communication device 104, the initiator application 228 may provide a user interface to a communication initiator 108 through which the contact initiator 108 may enter qualifications that the initiator 108 desires a contact recipient 116 to possess. As can be appreciated by one of skill in the art from the description provided herein, an initiator application 228 providing a user interface through which search criteria can be entered by a contact initiator 108 may be stored and/or deployed via the SBCI server 124 in combination with a web browser or other communication application running on the initiator communication device 104. In addition, an initiator application 228 provided as part of the SBCI server 124 may comprise an application or programming code for coordinating the operation of various other components or applications in connection with providing search-based contact initiation services. In accordance with further embodiments of the present invention, an initiator application 228 may be provided as part of a recipient communication device 112 for receiving qualifications information and contact address information from contact recipient 116.

One or more communication applications 232 may also be stored in data storage 220. In connection with an initiator communication device 104 or the recipient communication device 112, examples of communication applications 232 include web browsers, VoIP telephony applications, e-mail applications, instant messaging applications or any other applications for supporting communications between devices across a network 120. In accordance with other devices, such as the SBCI server 124 and/or qualifications records database 128, communication applications 232 supporting communications between the associated device and other devices via the communication network 120 may be provided.

Other application programming that may be stored in data storage 220 includes a search engine 236 and/or a policy engine 240. In general, the search engine may operate to search through records included in the qualifications records database 128 to identify candidate contact recipients 116 from the included records. The policy engine 240 may then be used to select a single communication or contact recipient from the identified candidate contact recipients 116. Accordingly, the policy engine 240 may implement conventional contact center agent selection policies or criteria with respect to a group of candidate communication recipients 116 identified by the search engine 236. In general, the search engine 236 and policy engine 240 may be included as part of the SBCI server 124, although this is not a requirement of the system 100.

Still another example of applications and data that may be included in the data storage 220 includes the qualifications records database 128. The qualifications records database 128 may comprise a storage system connected to other devices through the communication network 120, or it may be provided as part of another device, for example as part of a server 124.

A device 104, 112, 124, 128 may also include one or more communication network interfaces 244. Examples of communication network interfaces 232 include a packet data network interface, such as a wired or wireless Ethernet interface, or a Fibre Channel (FC) interface. As another example, a communication network interface 244 may comprise an interface to the PSTN or a PBX.

Figure 3:
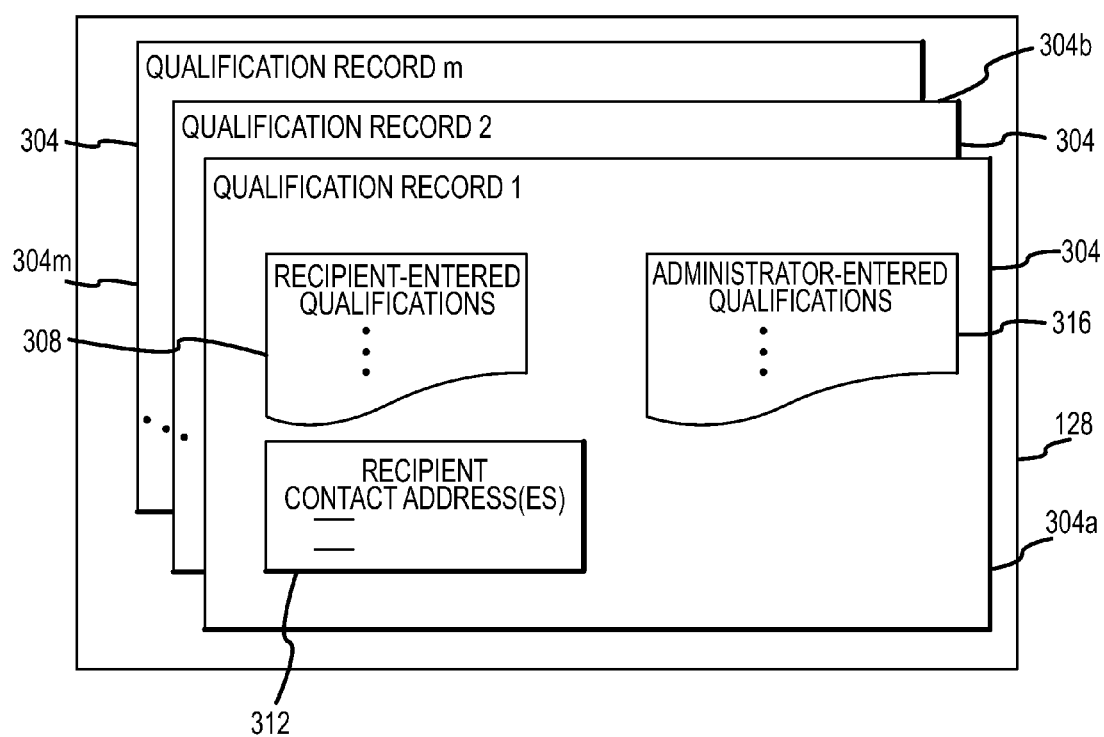
FIG. 3 depicts the contents of a qualifications records database in accordance with embodiments of the present invention.

The contents of a qualifications records database 128 in accordance with embodiments of the present invention are depicted in FIG. 3. In particular, the qualifications records database 128 generally includes a number of qualifications records 304. In general, a qualification record 304 is maintained for each candidate communication recipient 116 associated with the system 100. Each qualification record 304 generally includes recipient-entered qualifications 308. In accordance with embodiments of the present invention, recipient-entered qualifications 308 are not constrained to any particular set of qualifications or attributes. Accordingly, a candidate recipient 116 is free to enter terms describing or related to qualifications of that candidate recipient 116, without limitation. As a result, a system 100 in accordance with embodiments of the present invention can quickly adapt to advances in a particular field or the growth and development of a particular enterprise. In addition, because the candidate recipient 116 can enter the recipient-entered qualifications 308 directly, administrative overhead associated with requiring an administrator to determine and enter qualifications is avoided. In accordance with other embodiments of the present invention, recipient-entered qualifications 308 may comprise qualifications that are selected or provided by a candidate contact recipient 116, and that are then provided to an administrator or technician for actual entry as part of a qualification record 304. Whether or not a candidate actually performs data entry with respect to the recipient-entered qualifications 308, those qualifications are determined by the recipient, and are not necessarily constrained to a predetermined set of terms. By way of example and not limitation, recipient-entered qualifications 308 may relate to subject matter that a communication recipient 116 is qualified to handle. Accordingly, particular examples of recipient-entered qualifications 308 include: customer service, returns, technical support, sales support, billing, product manufacturer names, product model identifications, etc.

Each record 304 also includes one or more contact addresses 312 for the candidate recipient 116 associated with the particular qualification record 304. In accordance with embodiments of the present invention, a contact address 312 is not required to be a static address. Instead, presence documents can be used as a contact address 312. As used herein, a presence document is a set of information and/or an application that can provide a dynamically determined contact address for an associated contact recipient 116. Accordingly, examples of a presence document include an application that has access to a contact recipient's 116 calendar and that can route a call to an appropriate communication device 112 associated with that contact recipient 116 based on the contact recipient's 116 scheduled activity. Other examples of contact addresses 312 include a telephone number, e-mail address, pager number or any other address that can be used to initiate communications with the contact recipient 116.

A record 304 may also include administrator-entered qualifications 316. Administrator-entered qualifications 316 may include qualifications information for an associated communication recipient 116 that is determined by an administrator or other authority. The use of administrator-entered qualifications 316 can be useful in order to, for example, provide control over which candidate communication recipients 116 within an organization are allowed to receive contacts related to particular topics. Accordingly, examples of administrator-entered qualifications 316 include areas of expertise of the associated candidate recipient 116, as determined by the entity, or subject matter related to which the candidate recipient 116 is authorized to discuss with contact initiators 108. Particular examples of administrator-entered 116 include the communication channels over which the associated communication recipient 116 is authorized to conduct communications with communication initiators 108 (e.g., voice, email, chat), particular products regarding which the communication recipient 116 is qualified to provide information or support (e.g. product types, manufacturers and/or product models), and communication initiators 108 or classes of communication initiators with whom the contact recipient 116 is authorized to conduct communications.

Figure 4:
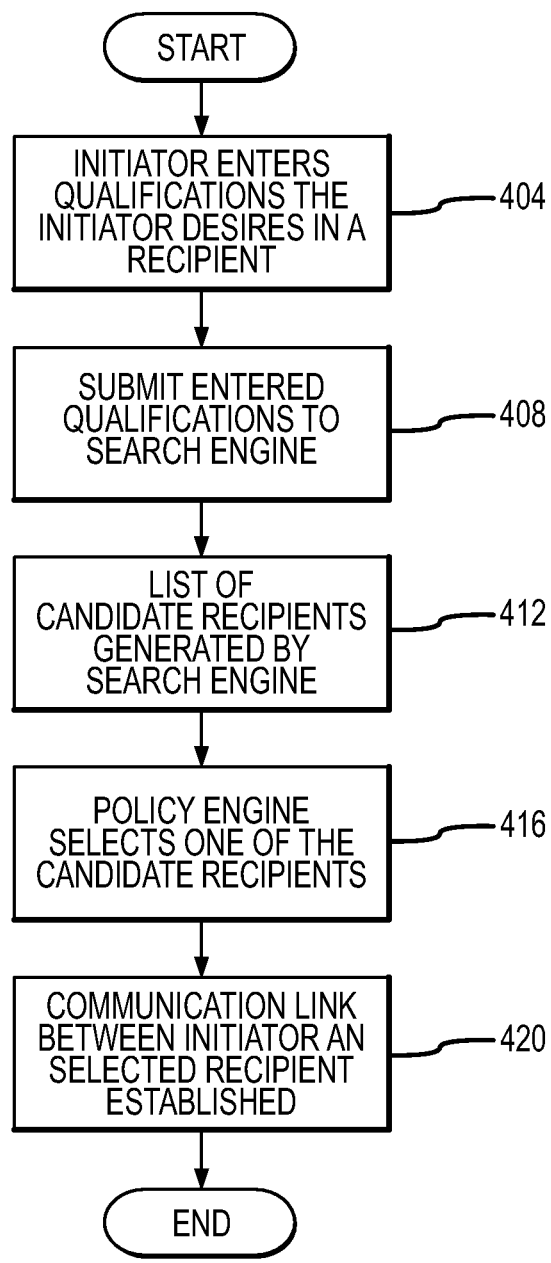
FIG. 4 is a flowchart depicting aspects of a process for receiving desired qualifications and establishing communications with an identified communication recipient in accordance with embodiments of the present invention.

FIG. 4 is a flowchart depicting aspects of a process for search-based contact initiation in accordance with embodiments of the present invention. The process starts with the initiator 108 entering qualifications that the initiator desires a recipient 116 to possess (step 404). In accordance with embodiments of the present invention, the desired qualifications are entered into a user interface associated with an initiator communication device 104. More particularly, the user interface may be provided by or associated with an initiator application 228 running on the initiator communication device 104, or running on the SBCI server 124 and accessed through a communication application 232 running on the initiator communication device 104. Accordingly, it can be appreciated that the initiator application 228 may be an application dedicated to servicing requests related to a particular entity, and/or can be provided by a particular service. Furthermore, embodiments of the present invention may be implemented in connection with services that require payment or other consideration from an initiator 108. Accordingly, the initiator 108 may be required to provide payment and/or information to an SBCI server 124 before the server 124 will accept and act on requests submitted by the initiator 108.

After satisfying any requirements for using the search-based contact initiation service provided through the SBCI server 124, the entered qualifications are submitted to the search engine 236 (step 408). A list of candidate recipients 116 is then generated by the search engine (step 412). In accordance with embodiments of the present invention, the search engine 236 generates a list of candidate communication recipients 116 by searching the records 304 contained in the qualifications records database 128. The candidate communication recipients 116 identified through the search performed by the search engine 236 may comprise those candidates determined to match or best match the search criteria entered by the initiator 108. In a typical implementation, the search engine 236 is executed by the SBCI server 124.

The policy engine 240 then selects one of the candidate recipients 116 from the list generated by the search engine 236 (step 416). In accordance with embodiments of the present invention, the policy engine 240 serves the same function as an automatic call distributor (ACD) used in conventional contact centers. Accordingly, the policy engine 240 may use criteria such as whether a particular contact is presently available, user-entered qualifications 304 and/or administrator-entered qualifications 316 having the highest relevance to the search criteria entered by the communication initiator 108, the rating associated with candidate communication recipients 116, the cost of using a particular communication recipient, the most idle communication recipient 116, or the least occupied communication recipient 116. In accordance with still other embodiments of the present invention, the policy engine 240 may select from a list of candidate communication recipients 116 randomly to select a single candidate recipient 116. The policy engine 240 is, in accordance with embodiments of the present invention, executed by the SBCI server 124.

At step 420, a communication link between the initiator 108 and the selected communication recipient 116 is established. In general, establishment of the communication link makes use of the contact address 312 for the selected communication recipient 116. More particularly, the contact address 312 will allow communications between the initiator communication device 104 and a recipient communication device 112 associated with the selected communication recipient 116. In accordance with embodiments of the present invention, establishment of the communication link may be performed by providing the contact address for the selected communication recipient 116 to the initiator communication device 104, so that the initiator communication device 104 can take action to establish the communication link. This may be accomplished by the SBCI server 124 through execution of an initiator application 228 operating on the SBCI server 124 providing the contact address 312 to an initiator application 228 running on the initiator communication device 104 or providing the contact address 312 to a communication application 332 running on the initiator communication device 104 in order to establish the communication link. In accordance with other embodiments of the present invention, the SBCI server 124 may provide the contact address 312 of the communication recipient 116, and identify the initiator communication device 104, to another device, such as a telephony switch or communication server, in order to establish the communication link. Upon establishment of the communication link, the initiator 108 is placed in communication with a communication recipient 116 that has indicated, through the recipient-entered qualifications 308 that they are qualified to handle the request of the initiator 108.

Figure 5:
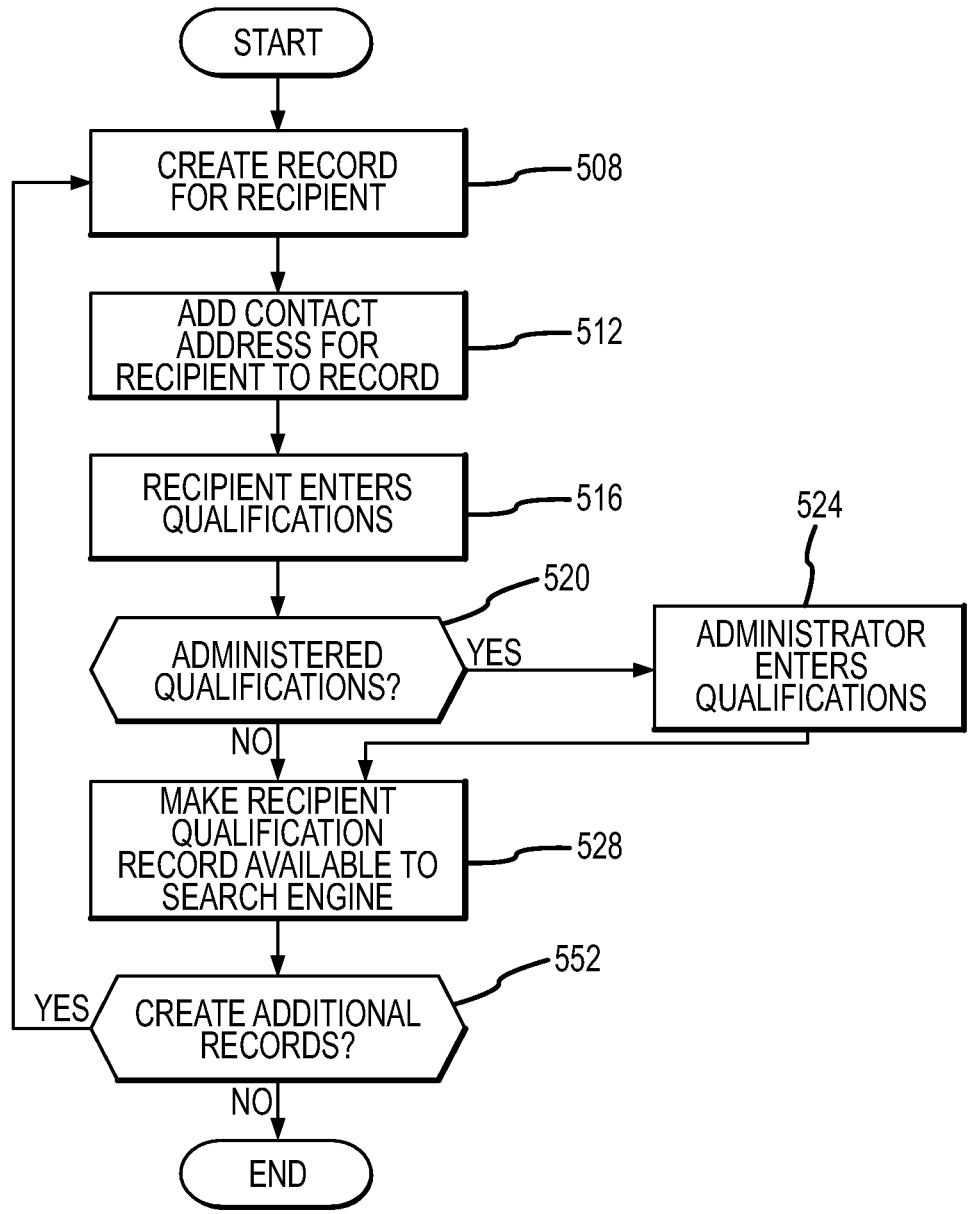
FIG. 5 is a flowchart depicting aspects of a process for creating candidate recipient qualifications records in accordance with embodiments of the present invention.

FIG. 5 illustrates a process for creating qualification records 304 in accordance with embodiments of the present invention. Initially, at step 504, a record 304 is created for a communication recipient 116. At step 512, the contact address 312 for the communication recipient 116 is added to the record 304 for that communication recipient 116. In general, the contact address 312 may comprise the address of a communication device 112 through which the communication recipient 116 can be contacted. As can be appreciated by one of skill in the art, the communication address 312 need not be statically associated with a particular recipient communication device 112. That is, a particular communication address 312 for a communication recipient 116 can be dynamically determined from information included as the contact address 312 in the qualification record 304. Accordingly, the communication address 312 may comprise both static addresses and/or dynamically determined addresses, such as addresses determined through presence documents. At step 516, the communication recipient 116 enters qualifications 308. In accordance with embodiments of the present invention, the recipient-entered qualifications 304 are not limited or constrained to any particular type or set of qualifications. Accordingly, a contact recipient 116 can publish their own qualifications and capabilities. As a result, the need for formal administration of qualifications information by an administrator can be eliminated. In addition, allowing individual communication recipients 116 to enter their own qualifications 308 facilitates an "organic" contact routing paradigm. Moreover, in an enterprise contact center environment, communication recipients 116 comprising human agents can tailor their lists of possible qualifications to enable them to capture the most appropriate incoming contacts from contact initiators 108. Although described as recipient-entered qualifications 304, it should be appreciated that user-entered qualifications 304 are not limited to data that the associated communication recipient 116 has performed data entry on. For example, recipient-entered qualifications 308 include qualifications that have been determined and/or selected by a communication recipient 116, and then provided to administrative and/or data entry personnel for approval and/or entry into a qualification record 304.

Although user-entered qualification records 308 are a unique feature of embodiments of the present invention, qualifications records 304 may also include administrator-entered or determined qualifications 316. Accordingly, control over particular subject matter areas or representations regarding appropriate qualifications can be exercised by administrative authorities. At step 520, a determination may be made as to whether administered qualifications 316 are to be entered. If administered qualifications are to be entered, an administrator may enter such qualifications (step 524).

After entering administrator-entered qualifications 324, or after determining that administered qualifications 316 are not to be included in a particular record 304, the recipient qualification record 304 is made available to the search engine 236 (step 528). The determination may then be made as to whether additional records 304 are to be created (step 532). If additional records 304 are to be created, the process may return to step 508. If no additional records 304 are to be created, the process may end.

As can be appreciated by one of skill in the art from the description provided herein, embodiments of the present invention may include a qualification record 304 for each candidate communication recipient 116 associated with a system 100. In addition, it can be appreciated that each qualification record 304 includes qualifications entered or at least specified by the associated qualification recipient 116. Data included in the qualification records 304 can be searched using criteria entered by the contact initiator 108. Neither the search criteria nor the qualifications entered by the communication recipient 116 need to be constrained to any particular set of terms. Accordingly, search-based contact initiation as provided herein is flexible. In addition, because a communication or contact is initiated upon the selection of a communication recipient 116 based on the entered search criteria, communications are established between the contact initiator 108 and an appropriate communication recipient 116 simply by entering search criteria. That is, a communication initiator 108 is not required to enter the contact address 312 of a communication recipient 116.

In addition, although exemplary embodiments of the present invention have been described in connection with enterprise contact centers that provide a search based contact initiation service to customers, other arrangements or contexts are within the scope of the present invention. For example, a search based contact initiation service as described herein may be offered for a fee by a third party. In addition, services may be provided by an enterprise for internal customers. In accordance with further embodiments of the present invention, the service may be provided in the context of social networking.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with the various modifications required by their particular application or use of the invention. It is intended that the appended claims be construed to include alternative embodiments to the extent permitted by the prior art.

What is claimed is:

1. A method for identifying a communication recipient having selected qualifications, comprising:
for each of a plurality of candidate communication recipients, receiving qualifications data and a contact address;
storing said received qualifications data and contact addresses;
receiving search criteria from a communication initiator;
searching said qualifications data using said received search criteria to identify a single communication recipient; and
initiating communication between said communication initiator and said identified single communication recipient using said contact address for said identified single communication recipient, wherein said initiating communication between said communication initiator and said identified single communication recipient includes providing said contact address for said identified single communication recipient to an initiator communication device to establish a communication link with said identified single communication recipient.

2. The method of claim 1, wherein said initiating a communication between said communication initiator and said identified communication recipient is performed without requiring input from said communication initiator subsequent to said receiving search criteria from said communication initiator.

3. The method of claim 1, wherein said contact address for at least one of said candidate communication recipients comprises a presence document providing dynamic contact addresses for said at least one of said candidate communication recipients.

4. The method of claim 1, wherein identifying a single communication recipient includes:
generating a list containing a number of candidate communication recipients associated with qualifications data that at least partially satisfies the search criteria received from the communication initiator; and
selecting one of said candidate communication recipients from the list according to a set of selection rules.

5. The method of claim 4, wherein said selecting one of said candidate communication recipients from the list according to a set of selection rules is performed by an automatic call distribution system.

6. The method of claim 4, wherein said list containing a number of candidate communication recipients is sorted according to relevance rules.

7. The method of claim 1, further comprising:
receiving additional qualifications data from an administrator; and
storing said additional qualifications data.

8. The method of claim 1, wherein said initiating communication between said communication initiator and said communication recipient includes providing said contact address for the communication recipient to a communication network.

9. The method of claim 1, wherein said communication between said communication initiator and said communication recipient comprises a real-time communication.

10. A system for initiating contacts, comprising:
an initiator communication device, including:
a user input operable to receive search criteria from a communication initiator;
a communication interface;
data storage, wherein a plurality of records are stored in said data storage, and wherein each of said records includes qualification information and a contact address associated with a communication recipient;
a recipient communication device, including:
a communication interface;
a communication link between said initiator communication device and said recipient communication device; and
a communication initiator application, wherein in response to search criteria received from a communication initiator at least one communication recipient is identified from said records as a best match for said received search criteria, wherein in response to identifying said best match for said received search criteria, said communication initiator application places said communication initiator and said communication recipient in communication with one another through said initiator communication device, said communication link, and said recipient communication device, wherein placing said communication initiator and said communication recipient in communication with each other includes providing a contact address for said recipient communication device to said initiator communication device, and wherein said initiator communication device uses said contact address to establish said communication link with said recipient communication device.

11. The system of claim 10, further comprising:
a qualifications records database, wherein said plurality of records are stored in data storage comprising said qualifications records database.

12. The system of claim 10, wherein said qualification information for at least one of said records includes qualifications entered by the communication recipient associated with the record.

13. The system of claim 12, wherein said qualification information for the at least one of the records additionally includes qualifications entered by an administrator.

14. The system of claim 10, further comprising a contact initiation server, wherein said communication initiation application is executed by the contact initiation server.

* * * * *

UNITED STATES PATENT AND TRADEMARK OFFICE
CERTIFICATE OF CORRECTION

PATENT NO. : 8,577,916 B1  
APPLICATION NO. : 11/469698  
DATED : November 5, 2013  
INVENTOR(S) : Michael Palmquist Page 1 of 1

It is certified that error appears in the above-identified patent and that said Letters Patent is hereby corrected as shown below:

In the Claims

Column 12, Line 27; delete "wherein in response" and add "wherein, in response"

Column 12, Line 29; delete "tor at least" and add "tor, at least"

Column 12, Line 31; delete "wherein in response" and add "wherein, in response"

Signed and Sealed this  
Eighth Day of September, 2015

Michelle K. Lee  
*Director of the United States Patent and Trademark Office*